(12) United States Patent
Kim et al.

(10) Patent No.: US 12,503,119 B2
(45) Date of Patent: Dec. 23, 2025

(54) PILLAR DISPLAY DEVICE FOR VEHICLE AND METHOD FOR CONTROLLING THE SAME

(71) Applicant: HYUNDAI MOBIS CO., LTD., Seoul (KR)

(72) Inventors: Jae Joong Kim, Seoul (KR); Bo Young Park, Seongnam-si (KR); Young Ji Hwang, Seoul (KR); Sang Il Chung, Seongnam-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 230 days.

(21) Appl. No.: 18/229,426

(22) Filed: Aug. 2, 2023

(65) Prior Publication Data

US 2024/0043013 A1 Feb. 8, 2024

(30) Foreign Application Priority Data

Aug. 3, 2022 (KR) .......................... 10-2022-0096939

(51) Int. Cl.
*B60W 40/08* (2012.01)
*B60W 50/14* (2020.01)

(52) U.S. Cl.
CPC ............ *B60W 40/08* (2013.01); *B60W 50/14* (2013.01); *B60W 2050/146* (2013.01); *B60W 2420/403* (2013.01); *B60W 2540/225* (2020.02)

(58) Field of Classification Search
None
See application file for complete search history.

(56) References Cited

U.S. PATENT DOCUMENTS

2008/0012938 A1* 1/2008 Kubota ................. B60Q 9/008
  348/118
2015/0138044 A1* 5/2015 Rawlinson ....... H04N 21/42201
  345/2.2
2017/0161950 A1* 6/2017 Seder ................... H04N 13/204
2018/0222490 A1* 8/2018 Ishihara ............... B60W 10/20
2018/0290593 A1* 10/2018 Cho ....................... G03B 17/54

FOREIGN PATENT DOCUMENTS

KR 101797086 B1 * 11/2017
KR 10-1809924 B1 12/2017
KR 10-2372963 B1 3/2022

OTHER PUBLICATIONS

Espacenet English Translation of KR101797086B1 (Year: 2017).*

* cited by examiner

*Primary Examiner* — James J Lee
*Assistant Examiner* — Andrew Sang Kim
(74) *Attorney, Agent, or Firm* — MORGAN, LEWIS & BOCKIUS LLP

(57) ABSTRACT

A pillar display device of a vehicle and a method of controlling the pillar display device are disclosed. According to embodiment of the present invention, a method of controlling a pillar display device of a vehicle includes capturing, by at least one external camera, at least one external image, capturing, by at least one internal camera, a gaze of a passenger who will be provided with the external image on a display screen, determining, by a gaze information processor, an area to be displayed on the display screen from among the external images captured based on the passenger's gaze, correcting, by an image optimizer, an image of the determined area, and transmitting, by an information transmitter, the corrected image to each display screen.

14 Claims, 20 Drawing Sheets

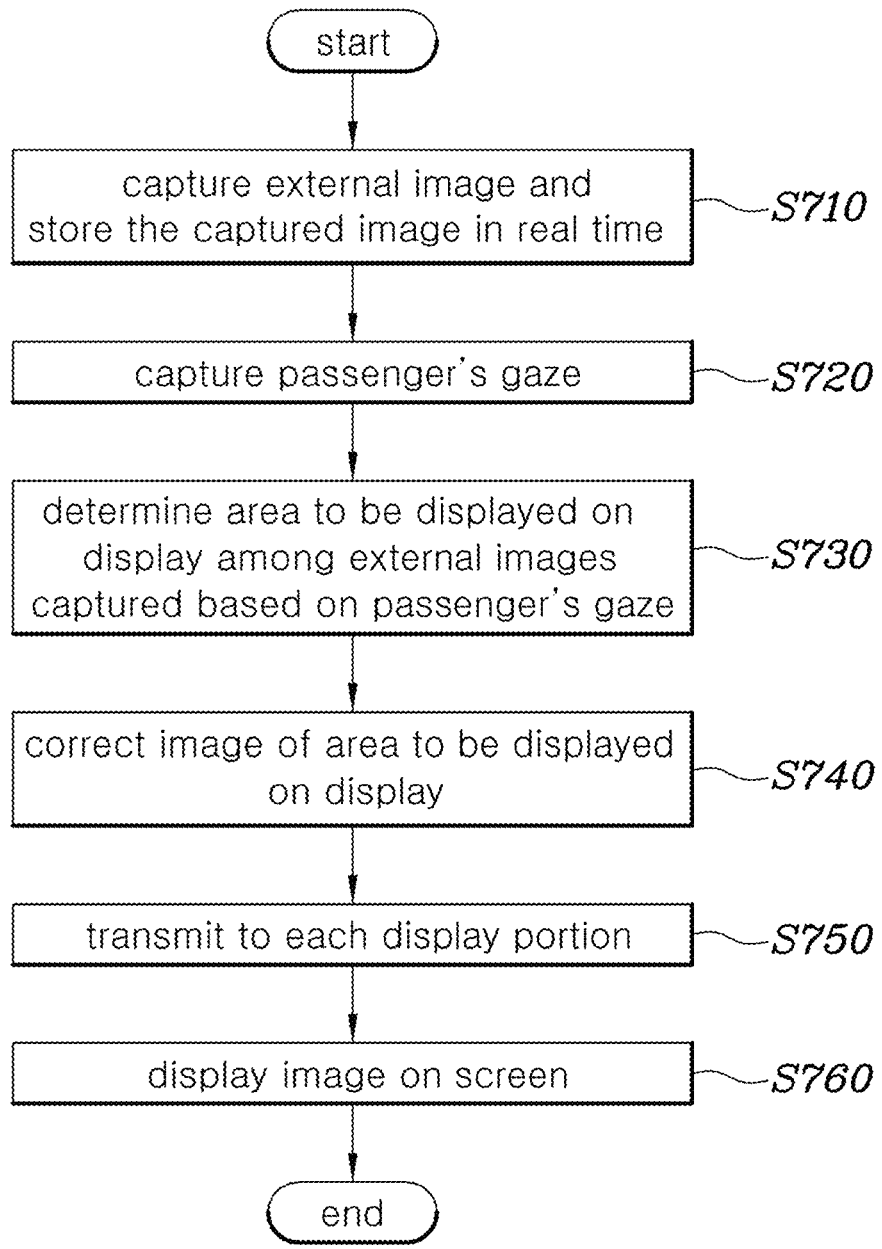

FIG. 14
| develop program in forms of four screens |
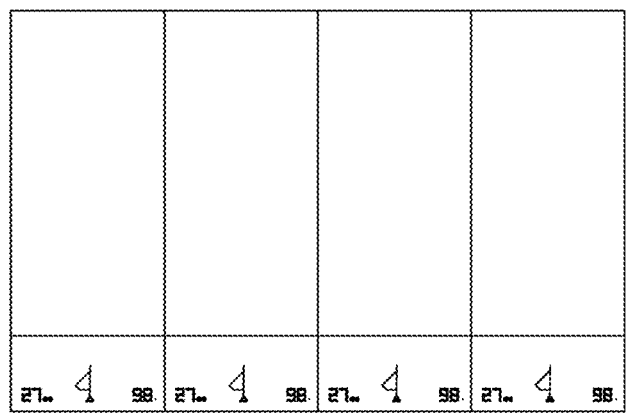
| use one screen for one display separately |
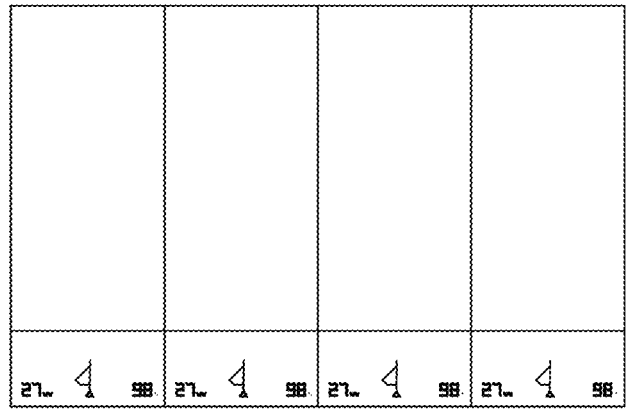
| minimize delay between multiple users using multi-touch interaction within one program |

PILLAR DISPLAY DEVICE FOR VEHICLE AND METHOD FOR CONTROLLING THE SAME

CROSS REFERENCE TO RELATED APPLICATION

The present application claims priority to Korean Patent Application No. 10-2022-0096939, filed Aug. 3, 2022, the entire contents of which is incorporated herein for all purposes by this reference.

BACKGROUND OF THE INVENTION

Field of the Invention

The present invention relates to a display device, and more particularly to a pillar display device and a method of controlling the pillar display device provided on the pillars of a vehicle.

Description of the Related Art

The pillars of a vehicle are supporting columns positioned between the doors and ceiling to provide added strength to the vehicle.

These vehicle pillars are typically made of opaque materials and are positioned between the windows of the vehicle, which poses a problem that the view of the driver in the driver's seat is blocked.

To resolve this problem, various technologies, such as retro-reflective projection technology that projects external images onto the area corresponding to the inside of the A-pillar between the windshield and the driver's side window in the vehicle to create an effect of seeming transparency and see-through A-pillar technology that captures the surroundings of the vehicle using surround view cameras and displays real-time images of the area that may be blocked by the A-pillar on an OLED display that wraps the inner portion of the A-pillar, have been developed.

However, since the size and area of the A-pillar are different for each vehicle, it is difficult to provide a single module that fits all vehicles, and mass production is another challenge.

Further, the design characteristics of the A-pillar, which often has a diagonal shape, may contribute to distortions in displayed and projected images, and the risk of distortion may increase depending on the driver's eye level and line of sight.

Further, most of these technologies focus on the A-pillars as the technologies are intended to secure the driver's field of view while the driver is driving. However, autonomous driving allows more flexible lines of sight so that the driver may observe all four directions.

On the other hand, the conventional A-pillar see-through projection technology simply displays an external image on the A-pillar.

Accordingly, in this field of technology, there is a demand for pillar display technology that can display images on pillars in four directions in consideration of the autonomous driving situation and provide a graphic user interface (GUI) or information that may be useful to the passenger on the external images projected on the pillars.

SUMMARY OF THE INVENTION

A technical object of the present invention is to display external images on displays installed in both the front and rear pillar areas of a vehicle, thereby creating an effect of seeming transparency, eliminating blind spots in the areas corresponding to the pillar areas, and providing passengers with a sense of openness.

Another technical object of the present invention is to provide all passengers with individualized display environments through a plurality of displays installed in the pillars of a vehicle and provide an additional graphic user interface to the external images displayed on the display, thereby offering various contents related to the driving environment.

The matters described above in the description of the related art are intended only for a better understanding of the background of the present invention and may include matters other than the conventional technology already known to those with common knowledge in the field to which the present invention pertains.

According to an embodiment of the present invention for achieving the objects, a method of controlling a pillar display device of a vehicle includes capturing, by at least one external camera, at least one external image, capturing, by at least one internal camera, the gaze of a passenger who will be provided with the external image on a display screen, determining, by a gaze information processor, an area to be displayed on the display screen from among the external images captured based on the gaze of the passenger, correcting, by an image optimizer, the image of the determined area, and transmitting, by an image information transmitter, the corrected image to each display screen.

At this time, in the determining an area to be displayed on the display screen, the area, the image of which looks seamlessly connected to the view visible through the vehicle's windshield and side windows to create a see-through effect as if the display screen were a window, may be determined to be the area to be displayed on the display screen.

At this time, the method of controlling the pillar display device may further include storing, by an image information processor, the captured external image in real time.

At this time, the method of controlling the pillar display device may further include displaying, by a display portion, the transmitted image on a screen.

At this time, the external camera is a 3D camera configured to capture a 3D image, and the external image may be a 3D image with depth.

At this time, in the correcting the image of the determined area, the image of the determined area may be corrected into an image optimized to ensure that the perspective, shape, and depth are not distorted when presented to the passenger.

At this time, in the displaying the transmitted image on the screen, the respective screens forming the display portion may be disposed at different angles.

At this time, the angles of the display screens may be adjusted to orient the display screens toward the passengers respectively matching the respective display screens, and then the rotated angles may be maintained.

At this time, the angles of the display screens may be adjusted in real time to orient the display screens toward the respective matching passengers.

Further, according to an embodiment of the present invention, the pillar display device of the vehicle may include at least one external camera capturing at least one external image, at least one internal camera capturing the gaze of a passenger who will be provided with the external image on a display screen, a gaze information processor determining an area to be displayed on the display screen from among the captured external images based on the passenger's gaze, an image optimizer correcting the image of the determined area, and an image information transmitter transmitting the corrected image to respective display screens.

At this time, the gaze information processor may determine an area, the image of which on the display screen looks seamlessly connected to the view visible through the vehicle's windshield and side windows to create a see-through effect as if the display screen were a window, to be the area to be displayed on the display.

At this time, the pillar display device may further include an image information processor storing the captured external image in real time.

At this time, the pillar display device may further include a display portion displaying the transmitted image.

At this time, the external camera may be a 3D camera configured to capture a 3D image with depth, and the external image may be a 3D image with depth.

At this time, the image optimizer may correct the image of the determined area into an image optimized to ensure that the perspective, shape, and depth are not distorted when presented to the passenger.

At this time, the respective display screens forming the display portion may be disposed at different angles.

At this time, the angles of the display screens may be adjusted to orient the display screens toward the passengers respectively matching the respective display screens, and then the adjusted angles may be maintained.

The angles of the display screens may be adjusted in real time to orient the display screens toward respective matching passengers.

According to various embodiments of the present invention as described above, blind spots may be eliminated, which is an advantage of conventional A-pillar see-through projection technology, and various contents related to driving environments may be offered by providing an additional graphic user interface (GUI) to the external image displayed on the corresponding display.

Further, obstruction of the front view may be minimized and outside environments such as pavements and sidewalks may be efficiently shown by disposing the display in the quarter view.

Further, various contents such as advertising information, augmented reality (AR) information, mixed reality (MR) information, and the like combined with outside environments may be offered.

Further, the four displays disposed in different directions rather than being worn on the body like a conventional head-mounted display (HMD) may provide immersive realistic images of environments.

Further, independent environments may be provided to different passengers through a plurality of displays, and two or four contents connected to each other may be offered on the plurality of displays as needed.

Further, content for which communication between passengers, such as message transmission, item delivery, and the like, is possible may be offered.

The effects obtainable from the present invention are not limited to the effects mentioned above, and other effects not mentioned will be clearly understood by those skilled in the art to which the present invention pertains from the following description.

BRIEF DESCRIPTION OF THE DRAWINGS

FIG. 7 is a flowchart illustrating a method of controlling a pillar display device according to an embodiment of the present invention.

FIG. 14 illustrates an example in which a plurality of display portions is implemented in a pillar display device according to an embodiment of the present invention.

DETAILED DESCRIPTION OF THE INVENTION

Figure 1:
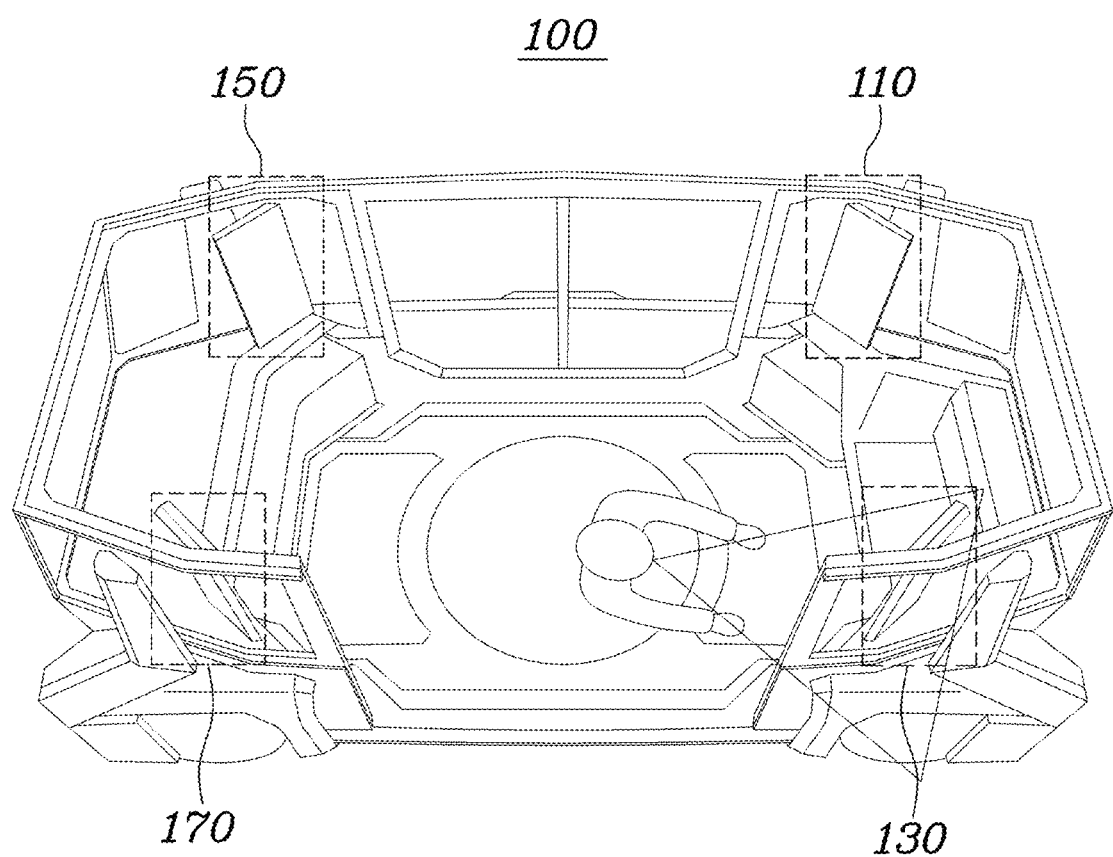
FIG. 1 schematically illustrates a structure of a pillar display device according to an embodiment of the present invention.

The embodiments disclosed herein will be described in detail with reference to the accompanying drawings. However, the same or similar components will be given the same reference numerals regardless of the drawing numbers, and the repetitive descriptions regarding these components will be omitted. The suffixes "module" and "unit" for the components used in the following description are given or interchangeably used only to facilitate the writing of the specification, without necessarily indicating a distinct meaning or role of their own. Further, when it is determined that the specific description of the related and already known technology may obscure the essence of the embodiments disclosed herein, the specific description will be omitted. Further, it is to be understood that the accompanying drawings are only intended to facilitate understanding of the embodiments disclosed herein and are not intended to limit the technical ideas disclosed herein are not limited to the accompanying drawings and include all the modifications, equivalents, or substitutions within the spirit and technical scope of the present invention.

The terms including ordinal numbers such as first, second, and the like may be used to describe various components, but the components are not to be limited by the terms. The terms may only be used for the purpose of distinguishing one component from another.

It is to be understood that when a component is referred to as being "connected" or "coupled" to another component, the component may be directly connected or coupled to the another component, but other components may be interposed therebetween. In contrast, it is to be understood that when a component is referred to as being "directly connected" or "directly coupled" to another component, no other component is interposed therebetween.

Singular expressions include plural expressions unless the context explicitly indicates otherwise.

In the present specification, terms such as "comprise" or "have" are intended to indicate the presence of implemented features, numbers, steps, manipulations, components, parts, or combinations thereof described in the specification and are not to be understood to preclude the presence or additional possibilities of one or more of other features, numbers, steps, manipulations, components, parts or combinations thereof.

FIG. 1 schematically illustrates a structure of a pillar display device according to an embodiment of the present invention. FIG. 1 shows that a pillar display device 100 according to an embodiment includes first to fourth pillar displays 110, 130, 150, 170. The first to fourth pillar displays 110, 130, 150, 170 display images captured in real time through external cameras so that the images may look seamlessly connected to the view visible from the passenger's position through the vehicle's windshield and side windows. That is, the images are displayed to create a see-through effect as if each of the first to fourth pillar displays 110, 130, 150, 170 is a window rather than a display. At this time, an augmented reality (AR) image including information about an area of interest and information related to the area of interest may be displayed on each of the pillar displays 110, 130, 150, 170. At this time the AR image including information about the area of interest and information related to the area of interest may include advertising information or discount information in the area of interest.

Figure 2:
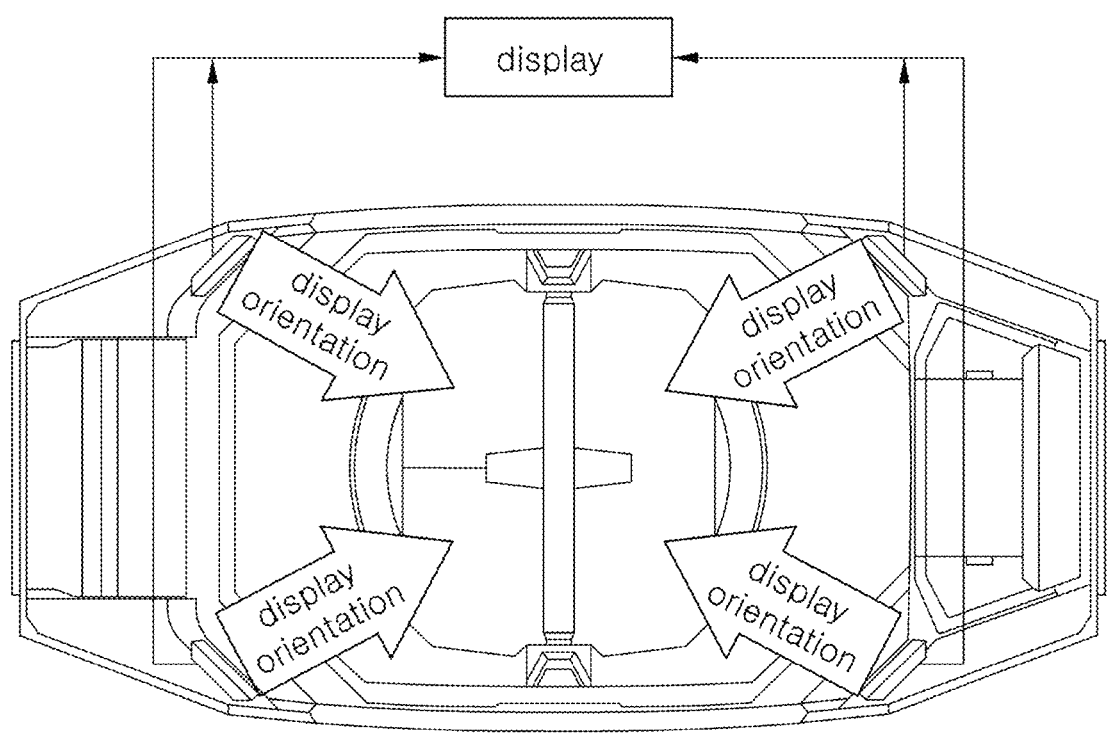
FIG. 2 illustrates screen orientations of respective pillar displays forming a pillar display device according to the embodiment of FIG. 1.

FIG. 2 illustrates screen orientations of respective pillar displays forming a pillar display device according to the embodiment of FIG. 1.

FIG. 2 shows that the angles of each of the pillar displays 110, 130, 150, 170 forming the pillar display device may be adjusted to orient the pillar displays toward the respective matching passengers, and then the adjusted angles may be maintained. That is, when the seats in the vehicle are respectively occupied by four passengers, the pillar displays 110, 130, 150, 170 respectively positioned at the four corners are oriented toward respective matching passengers to provide views optimized for the corresponding seats.

At this time, when only a single passenger is aboard the vehicle, the angles of the pillar displays 110, 130, 150, 170 forming the pillar display device may be adjusted to orient the displays toward the single passenger, and then the adjusted angles may be maintained.

That is, when seats matching the respective displays are occupied by passengers, the pillar displays 110, 130, 150, 170 may be rotated toward the respective matching passengers, and when a seat matching a display is unoccupied by a passenger, the display corresponding to the unoccupied seat may be rotated toward one of the passengers.

At this time, whether each seat is occupied by a passenger in the vehicle may be determined based on the image captured by a camera installed inside the vehicle.

At this time, each display is installed in the direction of a quarter view and does not interfere with the front and rear views.

Figure 3:
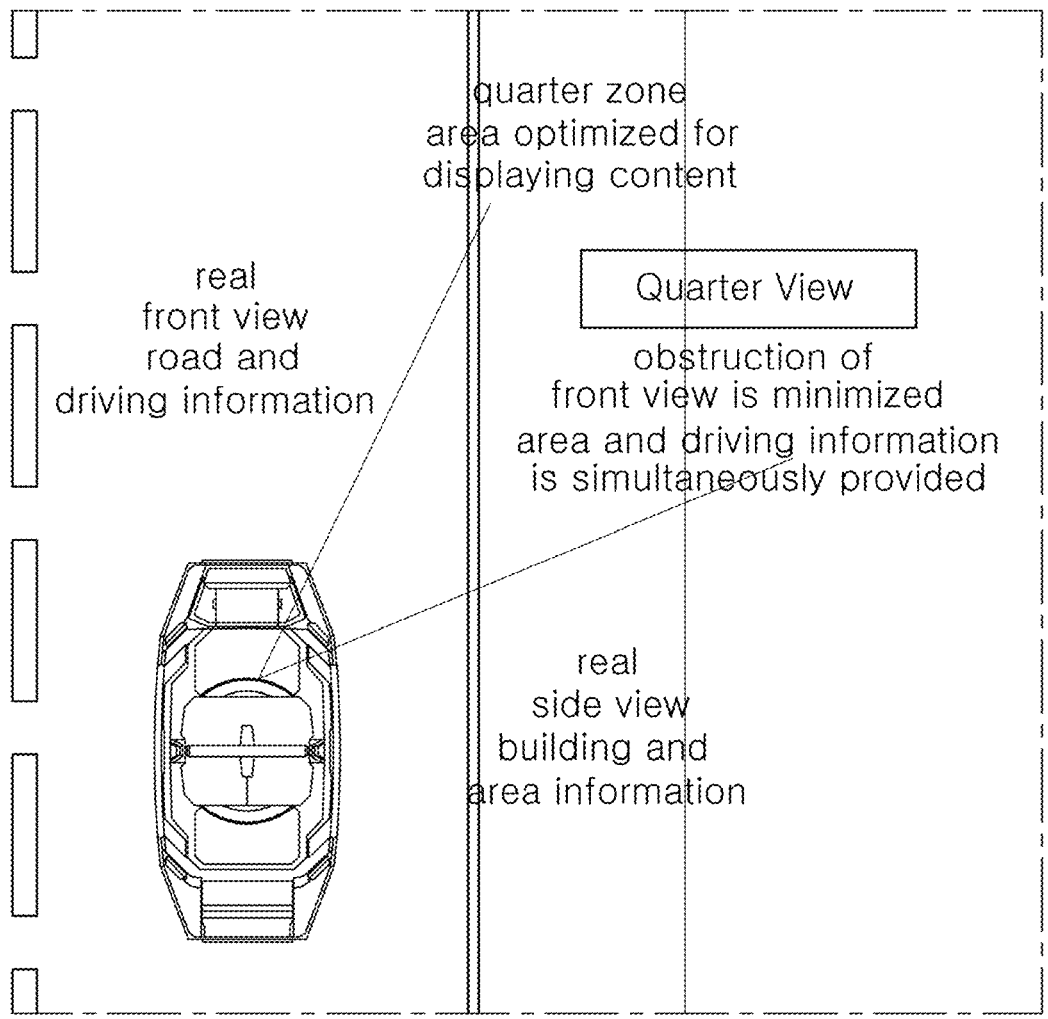
FIG. 3 illustrates an example of a display screen visible to a passenger and information that can be displayed thereon according to an embodiment of the present invention.

FIG. 3 illustrates an example of a display screen visible to a passenger and information that can be displayed thereon according to an embodiment of the present invention.

FIG. 3 shows that the passenger may check road information and driving information through the vehicle's windshield and building information and area information through side windows.

In the present specification, the area where a pillar is positioned between the vehicle's windshield and a side window is defined as a quarter zone. The quarter zone is an area optimized for displaying content in that additional information related to the road information and driving information visible in the front view as well as building information and area information visible in the side view may be displayed therein.

On the other hand, a view different from and between the front view, rear view, or side view may be secured through the pillar displays, and the view provided through these pillar displays is defined as the quarter view in the present specification. According to the present invention, the pillar display may simultaneously provide area information and driving information while minimizing obstruction of the front view through the quarter view.

Figure 4A:
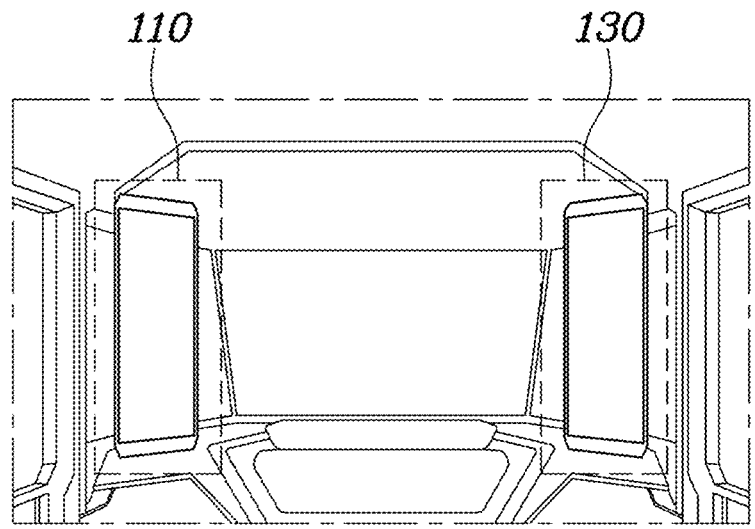
FIGS. 4A to 4C illustrate four pillar displays visible from the position of a passenger.
Figure 4B:
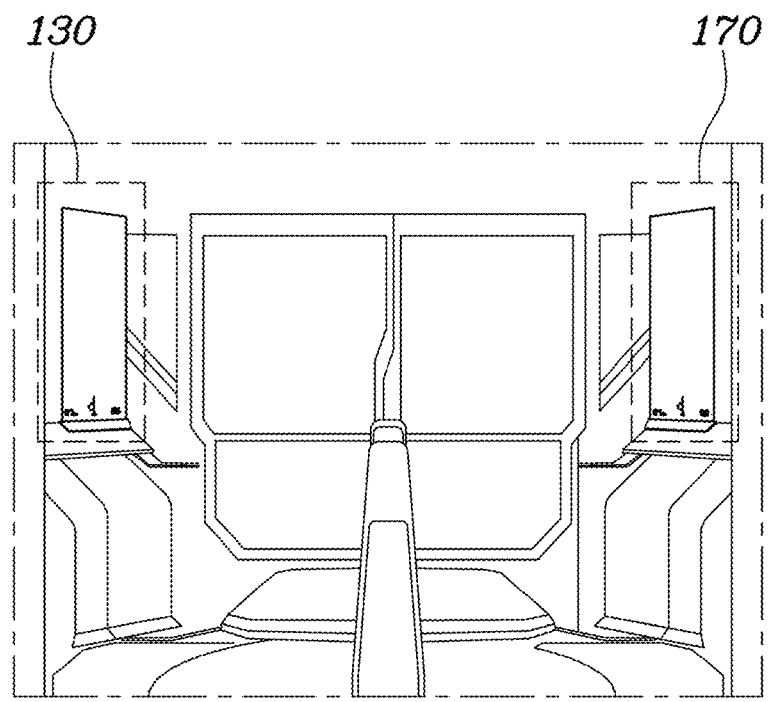
Figure 4C:
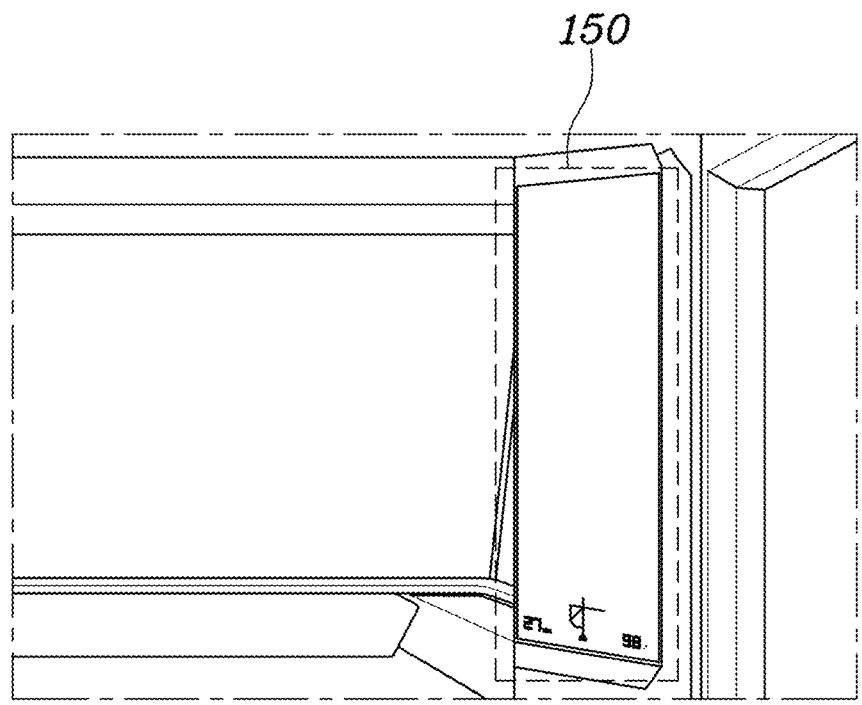

FIGS. 4A to 4C illustrate pillar displays visible in directions that a single passenger faces.

FIG. 4A illustrates a pillar display visible to a passenger facing forward in the driver's seat. FIG. 4A shows that the passenger can view the first and second displays 110, 130 when facing forward.

On the other hand, FIG. 4B illustrates the pillar displays visible to a passenger facing sideward in the driver's seat. FIG. 4B shows that the passenger can view the second and fourth displays 130, 170 when facing sideward.

Further, FIG. 4C illustrates the pillar displays visible to a passenger looking at the side view opposite the view in FIG. 4B in the driver's seat. FIG. 4C shows that the passenger can view the third display 150 when looking at the side view opposite the view in FIG. 4B.

It is difficult to check other pillar displays besides the A-pillar in the front of the vehicle from the driver's perspective. However, in an autonomous driving situation, the driver can observe all directions including the rear and sides as shown in FIGS. 4A to 4C. Further, the driver may be seated looking forward or may be seated looking back or sideward depending on the vehicle structure. Accordingly, it may be useful to provide the passenger with an external image or content through pillar displays on all four sides in the autonomous driving situation.

Figure 5:
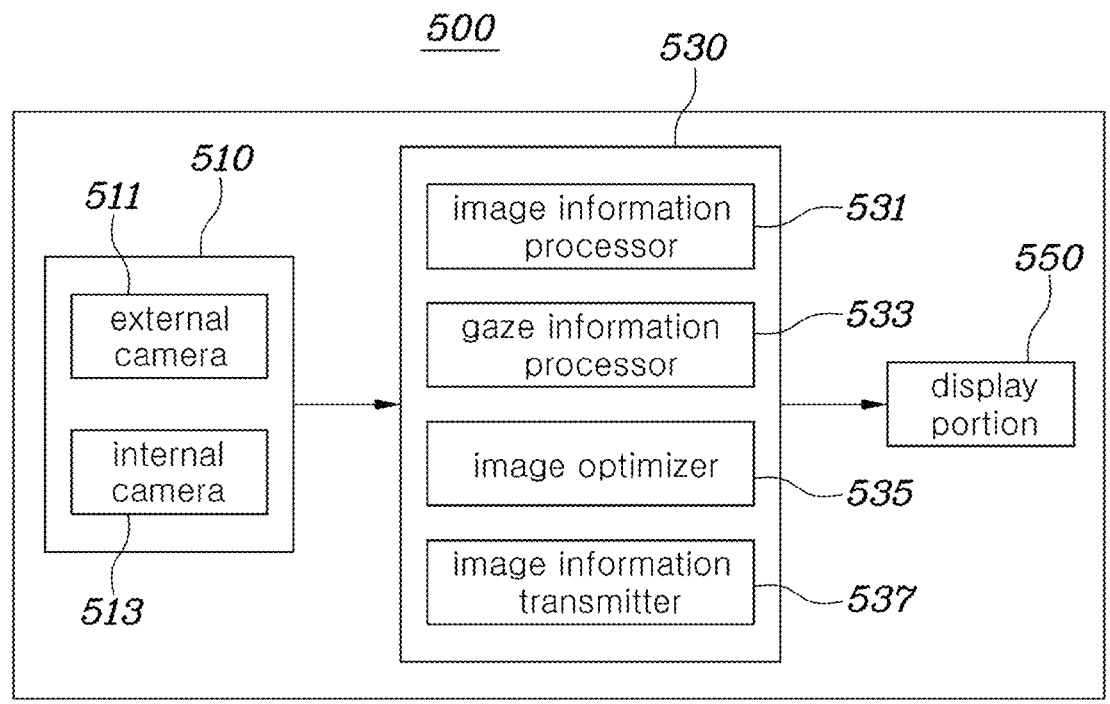
FIG. 5 is a block diagram illustrating a schematic configuration of a pillar display device according to an embodiment of the present invention.

FIG. 5 is a block view illustrating a schematic configuration of a pillar display device according to an embodiment of the present invention.

FIG. 5 shows that the pillar display device according to an embodiment of the present invention includes an image acquisition portion 510, an image processing portion 530, and an image display portion 550. Each of the components is not an indispensable component, and one or more components may be added or omitted. In addition, other components may be further included.

The image acquisition portion 510 acquires images by capturing images inside and outside images. The image acquisition portion 510 includes at least one external camera 511 and at least one internal camera 513.

The external camera 511 captures real-time images outside the vehicle to be displayed through the display portion 550. At this time, the external camera 511 may include four different cameras, and each of the external cameras may capture images in four different directions from the vehicle: front right, front left, rear right, and rear left, in order to display images on four different display screens.

At this time, the external camera 511 may be a 3D camera configured to capture a 3D stereoscopic image with depth.

The internal camera 513 captures a passenger seated inside the vehicle. At this time, the internal camera may capture the passenger's gaze to detect the passenger's gaze direction. At this time, the internal camera 513 may include four different cameras, and each internal camera may capture the gaze of the passengers seated in different seats.

Further, the internal camera 513 may support the air-touch function of the display portion 550 by detecting the passenger's gestures for controlling the display portion 550.

The data processing portion 530 generates image data that may be displayed on the display portion 550 based on the image acquired by the image acquirer 510. At this time, the data processing portion 530 may generate advertising content, AR content, MR content, and the like by synthesizing information about an area of interest or information related to the area of interest with the captured external image.

The data processing portion 530 includes an image information processor 531, a gaze information processor 533, an image-gaze mapping processor 535, and an image information transmitter 537.

The image information processor 531 stores in real time the external image data captured by the external camera 511 in the form of a 3D image with depth.

The gaze information processor 533 selectively determines an area, from among the external images captured by the external camera 511, to be the area to be displayed on the display portion 550 based on the passenger's gaze captured by the internal camera 513. At this time, the gaze information processor 533 determines a part of the area in the images captured by the external camera 511 to be the area to be displayed on the display portion 550 so that the image of the area displayed on the display portion 550 may look seamlessly connected to the view visible through the vehicle's windshield and side windows from the passenger's perspective. That is, the area that may create a see-through effect as if each of the pillar displays is a window rather than a display is determined to be the area to be displayed on the display.

At this time, when all seats in the vehicle are occupied by passengers, the gaze information processor 533 may select areas to be displayed on each of the display screens forming the display portion 550 based on the gaze of each passenger from among a plurality of image data captured by a plurality of external cameras 511.

Further, when some seats in the vehicle are unoccupied by passengers, the gaze information processor 533 may select areas to be displayed on the corresponding display screens based on the gaze of a passenger seated in another seat.

At this time, when other seats are occupied by a plurality of passengers, the images to be displayed on the display screens matching the unoccupied seats may be selected based on passengers selected according to predetermined criteria.

The image optimizer 535 corrects the image of the area determined by the gaze information processor 533 into an image optimized to ensure that the perspective, shape, and depth are not distorted when presented to the passenger.

At this time, the image optimizer 535 may correct the image to ensure that the perspective, shape, and depth of the different image data to be displayed on respective display screens different from each other are not distorted when presented to the passengers matching the corresponding display screens.

The image information transmitter 537 transmits the image optimized by the image optimizer 535 to the display portion 550. The display portion 550 displays the image received from the image information transmitter 537 on the display screen.

At this time, the display portion 550 may include a plurality of display screens disposed at different angles as in FIGS. 1 and 2.

At this time, the angle of each of the display screens forming the display portion 550 may be adjusted to orient the display screens toward the passengers respectively matching the respective display screens, and then the adjusted angles may be maintained. That is, when the seats in the vehicle are occupied by four passengers, the pillar displays respectively positioned at four corners are oriented toward respective matching passengers to provide views optimized for the corresponding seat.

Further, the angles of the display screens may be adjusted in real time to orient the display screens toward respective matching passengers.

At this time, when a single passenger is aboard the vehicle, the angles of the pillar displays forming the display portion 550 may be adjusted to orient the pillar displays toward the single passenger, and then the adjusted angles may be maintained.

That is, the pillar displays may be rotated toward the respective matching passengers when the seats matching respective displays are occupied by passengers, and when seats are unoccupied by passengers, the displays corresponding to the unoccupied seats may be rotated toward other passengers.

At this time, whether each seat in the vehicle is occupied by a passenger may be determined based on the image captured by the internal camera 513.

Figure 6:
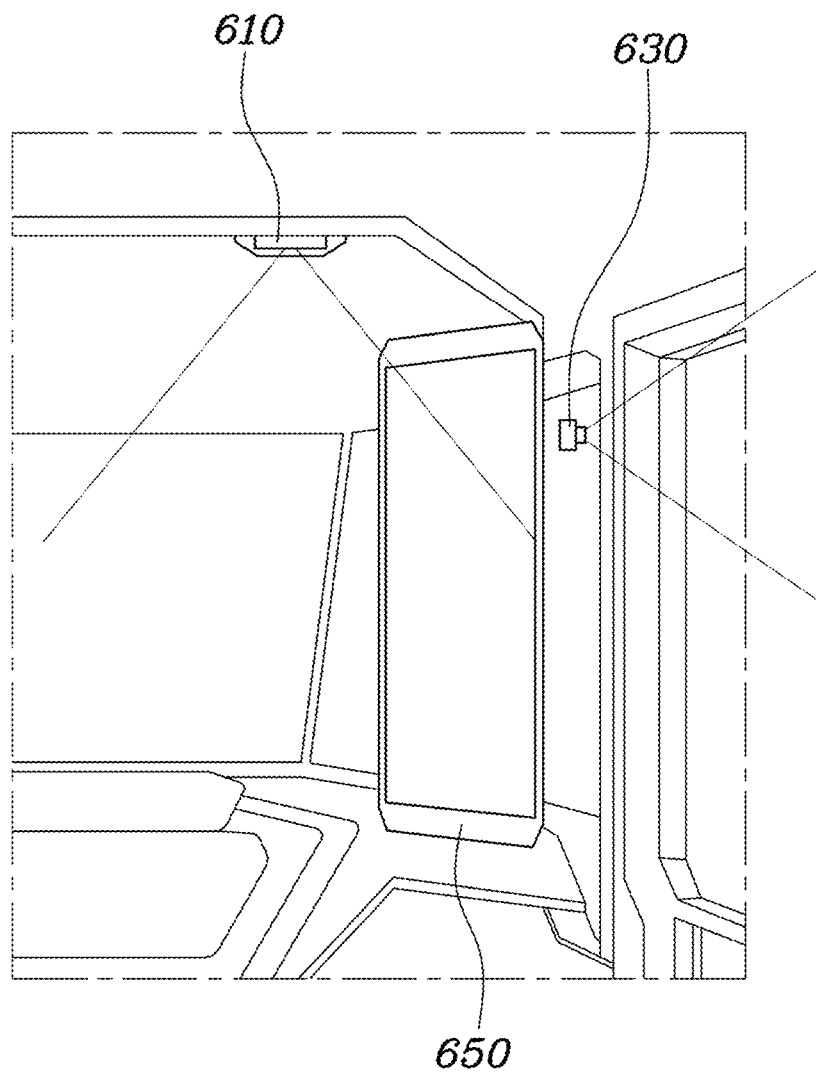
FIG. 6 illustrates an example of an internal camera, an external camera, and a display portion forming a pillar display device according to the embodiment of FIG. 5.

FIG. 6 illustrates an example of an internal camera, an external camera, and a display portion forming a pillar display according to an embodiment of the present invention.

FIG. 6 shows that the internal camera 610, the external camera 630, and the display portion 650 forming the pillar display device may be provided in accordance with the seating capacity of the vehicle, and the internal camera 610, the external camera 630, and the display portion 650 can respectively operate to offer image content optimized for the passenger in the corresponding seat.

FIG. 7 is a flowchart illustrating a method of controlling a pillar display device according to an embodiment of the present invention. According to the embodiment, the operating method of the pillar display device 500 may be performed by each of the components forming the pillar display device 500.

FIG. 7 shows that the pillar display device 500 captures external images and stores the captured images in real time.

At this time, the external images may be captured by the external camera 511 of the image acquisition portion 510.

At this time, the external camera may be a 3D camera configured to capture 3D images with depth, and the external images may be 3D imaged with depth.

At this time, the captured image may be stored by the image information processor 531 of the data processing portion 530 in real time.

Further, the pillar display device 500 captures a passenger's gaze and detects the passenger's gaze direction.

At this time, capturing the passenger's gaze may be performed by the internal camera 513 of the image acquisition portion 510

At this time, the internal camera 513 may include four different cameras, and each internal camera may capture the gazes of the passengers seated in different seats.

Further, the pillar display device 500 selectively determines some areas from among the external images captured by the external camera 511 based on the passenger's gaze captured by the internal camera to be areas to be displayed on the display portion 550.

At this time, the operation in step S730 may be performed by the gaze information processor 533 of the data processing portion.

At this time, when a part of the area from among the external images captured by the external camera 511 is selectively determined to be the area to be displayed on the display portion 550 in step S730, a part of the area in the images captured by the external camera 511 is determined to be the area to be displayed on the display portion 550 so that the image displayed on the display portion 550 may look seamlessly connected to the view visible through the vehicle's windshield and side windows from the passenger's point of view. That is, the area that may create the see-through effect as if each of the pillar displays is a window rather than a display is determined to be the area to be displayed on the display.

At this time, when all seats in the vehicle are respectively occupied by passengers in step S730, areas to be displayed on each of the display screens forming the display portion 550 may be selected based on each passenger's gaze from among a plurality of image data captured by a plurality of external cameras 511.

Further, when some seats in the vehicle are unoccupied by passengers in step S730, an area to be displayed on the display screen matching the unoccupied seat may be selected based on the gaze of a passenger in another seat.

At this time, when other seats are occupied by a plurality of passengers, the image to be displayed on the display screen matching the unoccupied seat may be selected based on a passenger selected based on a predetermined criterion.

Further, the pillar display device 500 corrects the image data of the area to be displayed on the display determined in S730 into an image optimized to ensure that the perspective, shape, and depth are not distorted when presented to the passenger.

At this time, the operations in step S740 may be performed by the image optimizer 535 of the data processing portion 530.

At this time, images may be corrected to ensure that the perspective, shape, and depth of the different image data to be displayed on display screens different from each other are not distorted when presented to the passengers matching the corresponding display screens.

Further, the pillar display device 500 transmits the image optimized in step S740 to the display portion 550.

Further, the pillar display device 500 displays the image received by the display portion 550 in step S740 on the screen.

At this time, the display portion 550 may include a plurality of display screens disposed at different angles as in FIGS. 1 and 2.

Further, when images are displayed on screens in step S760, the angle of each of the display screens forming the display portion 550 may be adjusted to orient the display screens toward the passengers respectively matching the respective display screens, and then the adjusted angles may be maintained. That is, when the seats in the vehicle are occupied by four passengers, the pillar displays respectively positioned at the four corners are oriented toward respective matching passengers to provide views optimized for the corresponding seats.

Further, the angle of respective display screens may be adjusted in real time to orient the display screens toward matching passengers.

At this time, when only a single passenger is aboard the vehicle, the angles of the pillar displays forming the display portion 550 may be adjusted to orient the pillar displays toward the single passenger, and then the adjusted angles may be maintained.

That is, when the seats are occupied by passengers, the pillar displays may be rotated toward respective matchings passengers, and when seats are unoccupied by passengers, the displays corresponding to the unoccupied seats may be rotated toward other passengers.

At this time, whether each seat in the vehicle is occupied by a passenger may be determined by an image captured by the internal camera 513.

Figure 8A:
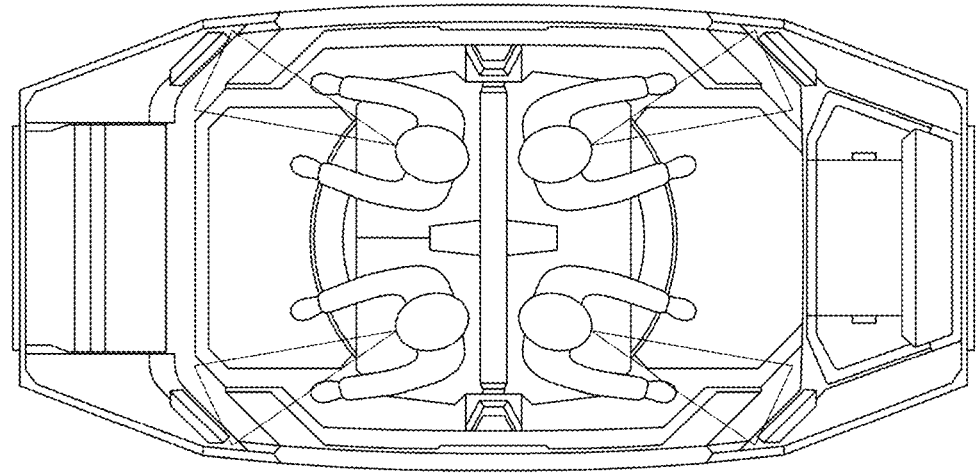
FIGS. 8A and 8B illustrate examples in which respective display portions of a pillar display device are used as personal display devices for respective passengers according to the present invention.
Figure 8B:
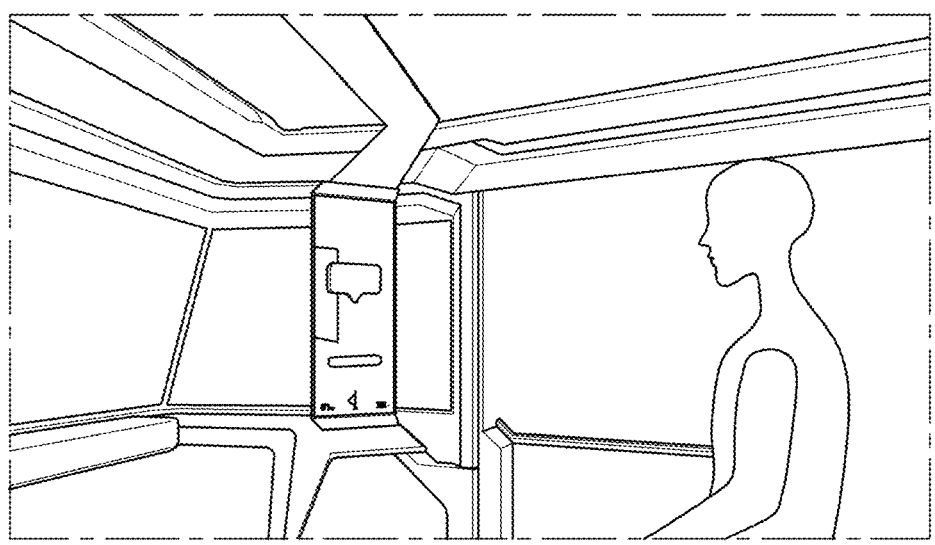

FIGS. 8A and 8B illustrate examples in which respective display portions of a pillar display device are used as personal display devices for respective passengers according to the present invention.

FIGS. 8A and 8B show that passengers in each seat of the vehicle can use the four displays disposed in each seat as a personal display.

At this time, the four displays are disposed toward respective matching seats in the quarter zones on four sides, so the displays are independent of the respective passenger's gaze and thus free from screen interference.

At this time, each passenger may receive various contents through a large pillar-shaped display.

Figure 9:
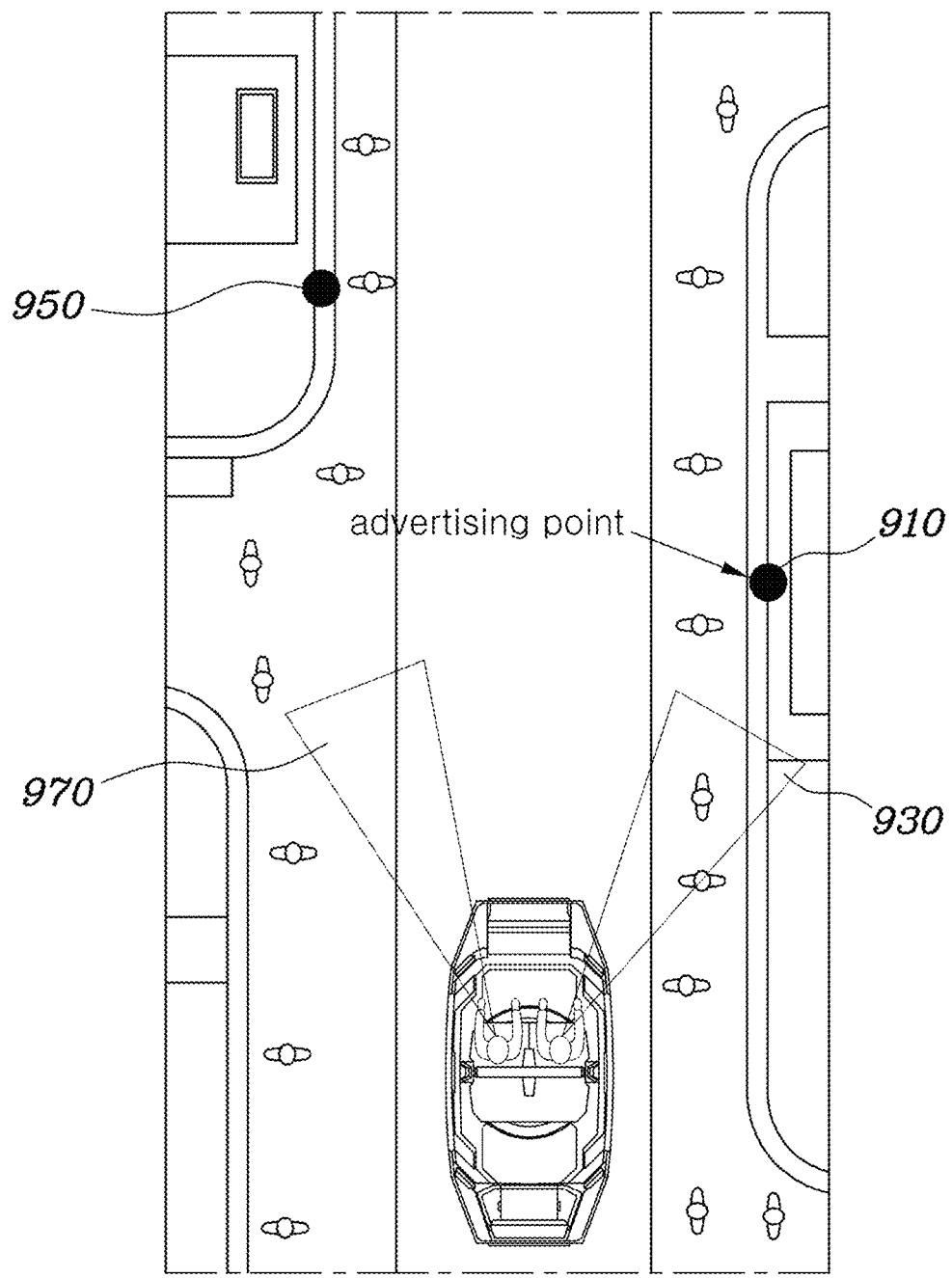
FIG. 9 illustrates an example in which different advertising contents are offered to passengers in different seat positions in a vehicle equipped with a pillar display device according to an embodiment of the present invention.

FIG. 9 illustrates an example in which different advertising contents are offered to passengers in different seat positions in a vehicle equipped with a pillar display device according to an embodiment of the present invention.

In FIG. 9, an area 930 indicated by an inverted triangle on the right front side of the vehicle represents an area of the external image that can be displayed on the pillar display positioned on the A-pillar on the right side of the vehicle, and an area 970 indicated by an inverted triangle in the left front represents an area of the external image that can be displayed on the pillar display positioned on the A-pillar on the left side of the vehicle.

FIG. 9 shows that when the first advertising point 910 comes within the inverted triangular area 930 on the right side while the vehicle is moving forward, information about the first advertising point 910 and advertising information matching the first advertising point 910 may be displayed on the pillar display positioned on the A-pillar on the right side of the vehicle and that when the second advertising point 950 comes within the inverted triangular area on the left side 970, information about the second advertising point 950 and advertising information matching the second advertising point 950 may be displayed on the pillar display positioned on the A-pillar on the left side of the vehicle.

At this time, coupon information besides the advertising information may be displayed on the pillar display device.

Figure 10A:
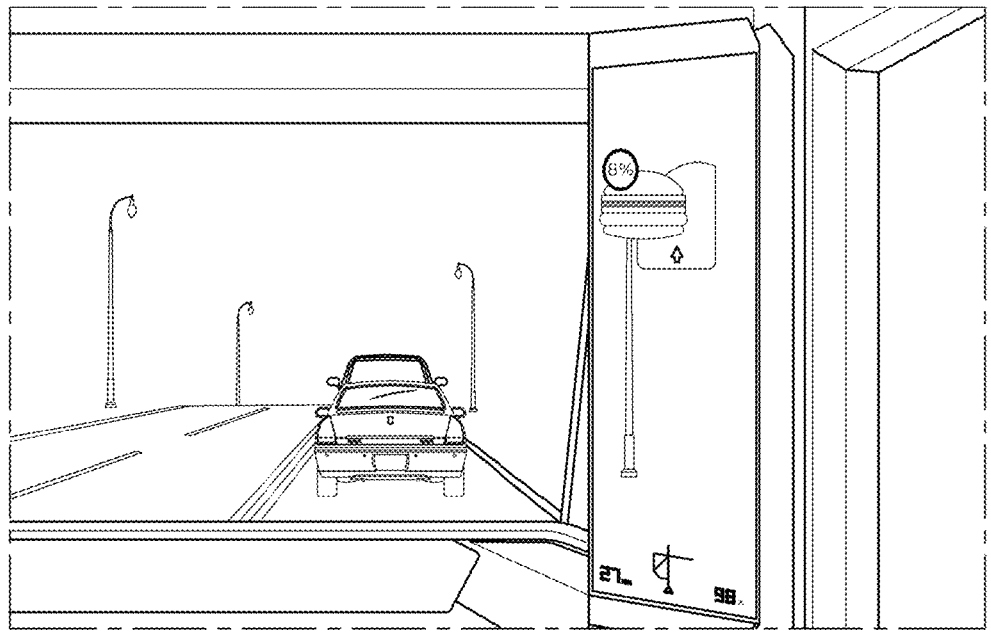
FIG. 10 illustrates an example in which advertising and coupon offerings by a hamburger joint are displayed in a pillar display device according to the present invention.
Figure 10B:
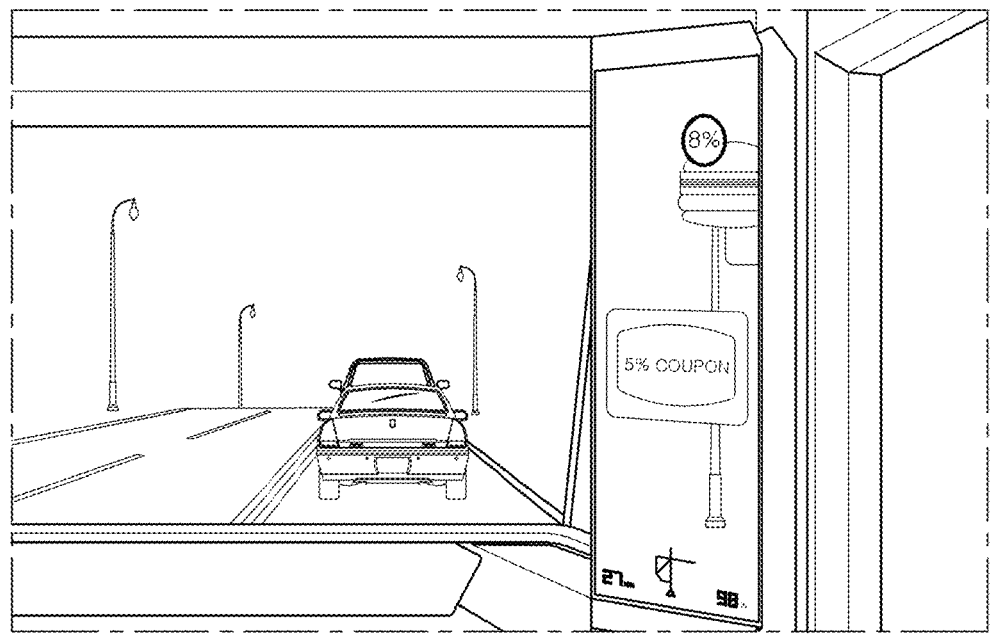

For example, information about a hamburger joint or discount information may be displayed on the pillar display screen as shown in FIG. 10A, and when a user selects discount information displayed on the screen by a method of screen touch or air touch, an enlarged discount coupon may be displayed on the display screen as shown in FIG. 10B. The user may store such a discount coupon in their terminal or the like and present or submit the coupon to an employee when visiting a store to receive the discount benefits.

Figure 11A:
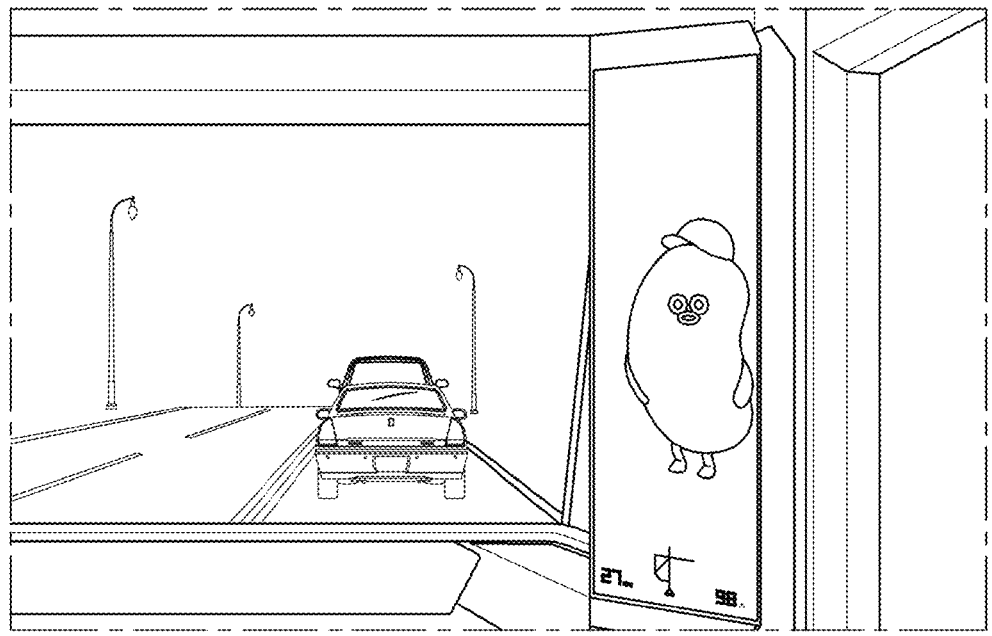
FIG. 11 illustrates an example in which advertising and coupon offerings by a jelly store are displayed in a pillar display device according to the present invention.
Figure 11B:
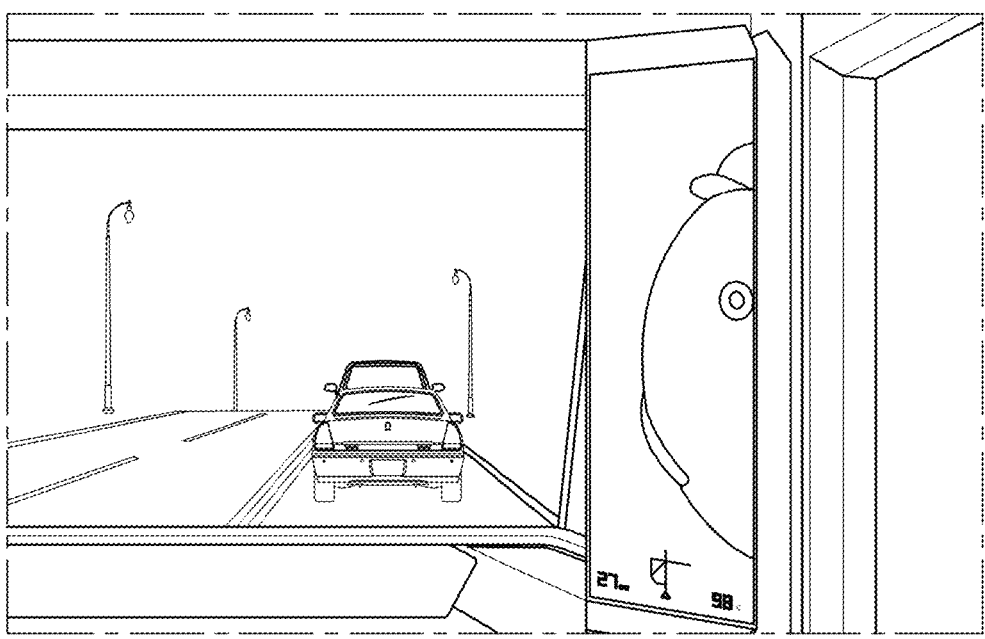
Figure 12A:
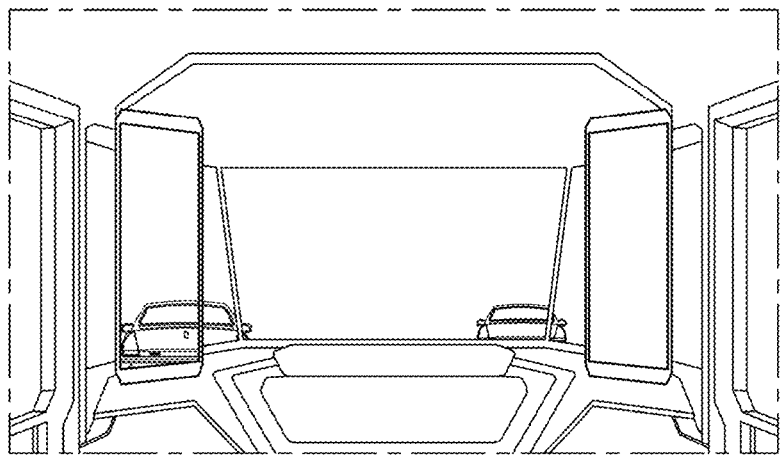
FIG. 12 illustrates an example in which immersive content is offered in a pillar display device according to the present invention.
Figure 12B:
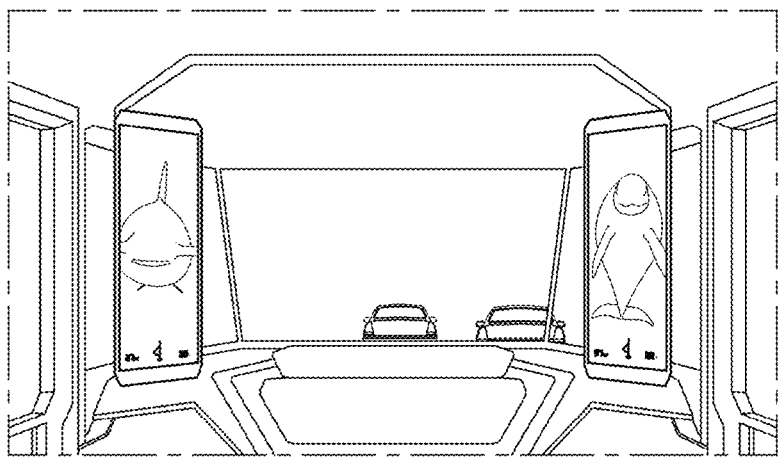
Figure 12C:
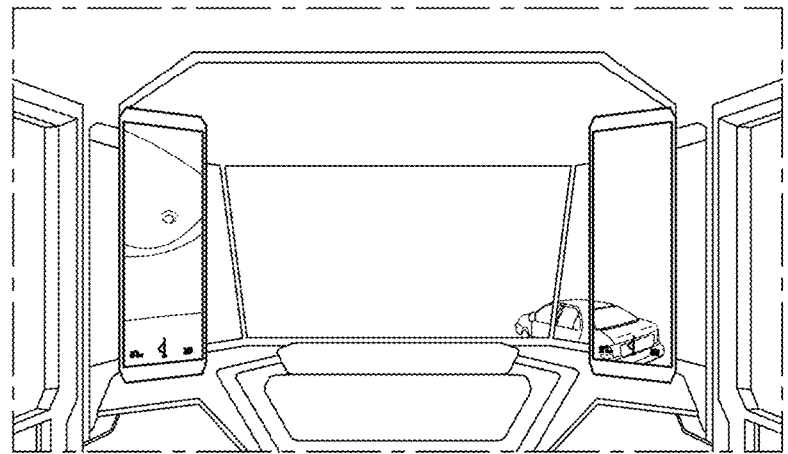
Figure 12D:
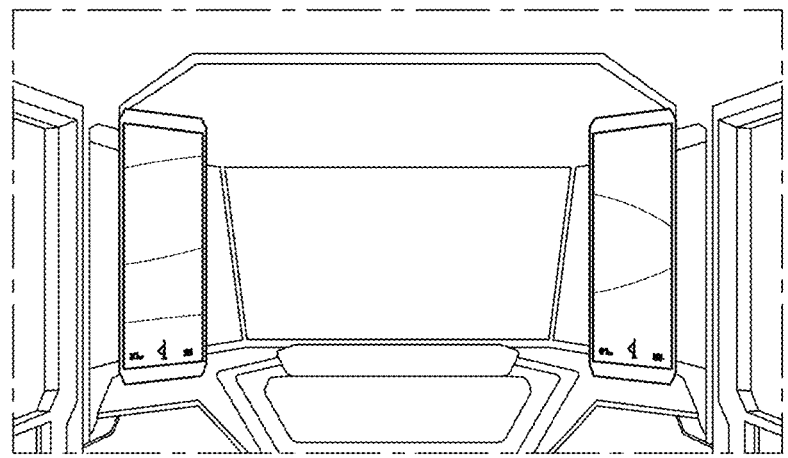
Figure 12E:
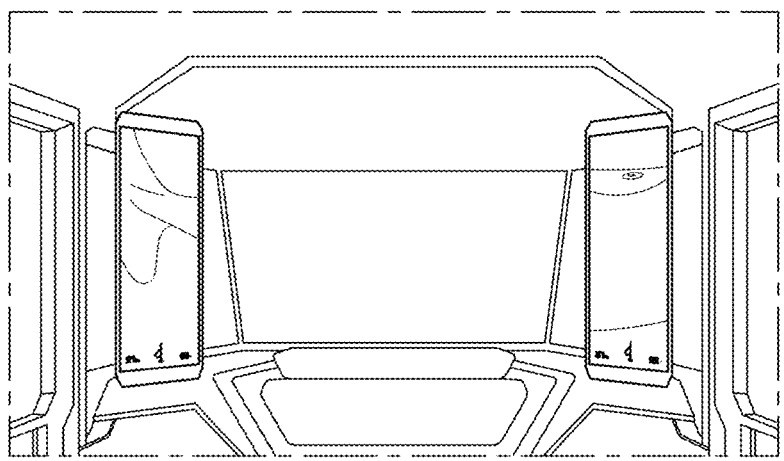

Another example is the display of information about a jelly store and discount information display on the pillar display screen of a user as shown in FIG. 11A. When the user selects the discount coupon by a method of screen touch and air touch, an enlarged discount coupon may be displayed on the display screen as shown in FIG. 11B. The user may also store such a discount coupon in their terminal and the like and present or submit the couple to an employee when visiting a store to receive the discount benefits.

FIGS. 12A to 12E illustrate an example in which immersive content is offered in the pillar display device according to the present invention. Some of the screens illustrated in FIGS. 12A to 12E may be displayed on the two displays disposed in the front of the vehicle, while others may be displayed on the two displays disposed in the back of the vehicle.

FIGS. 12A to 12E shows that the pillar display according to the present invention may offer immersive content or connected content to the passengers of the vehicle's four directional quarter view displays.

Further, the passenger may enjoy the content through two display views connected to their front or rear.

FIGS. 13A to 13F illustrate an example in which communication content between passengers is offered in a pillar display device according to the present invention. At this time, the display screen positioned on the left may be referred to as a first display 1301 and the display screen positioned on the right may be referred to as a second display 1330.

FIGS. 13A to 13F show that when an advertising point that may offer a discount coupon is positioned on the right front of the vehicle while the vehicle is driving, an icon 1350 for the discount coupon may also be displayed on the screen of the second display 1330. At this time, the passenger on the right seat of the vehicle may select the icon 1350 by the method of direct screen touch or air touch through a gesture. When the icon 1350 is selected by the passenger, an enlarged discount coupon 1360 may be displayed on the second display 1330.

Figure 13A:
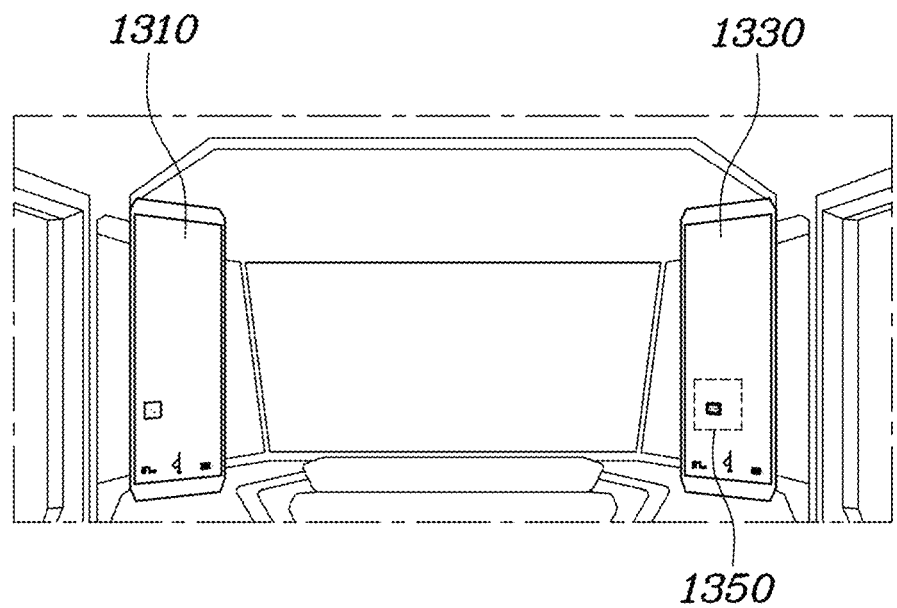
FIG. 13 illustrates an example in which communication content between passengers is offered in a pillar display device according to the present invention.
Figure 13B:
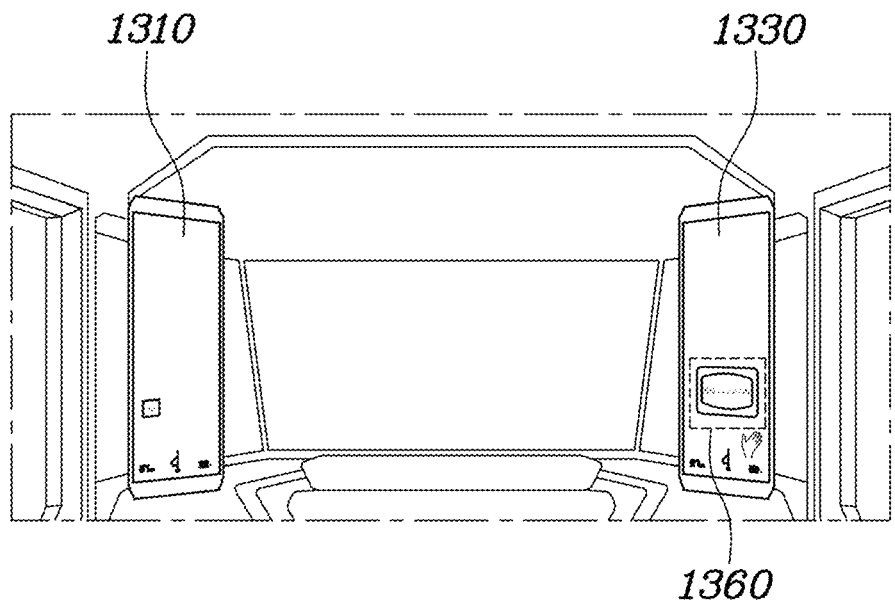
Figure 13C:
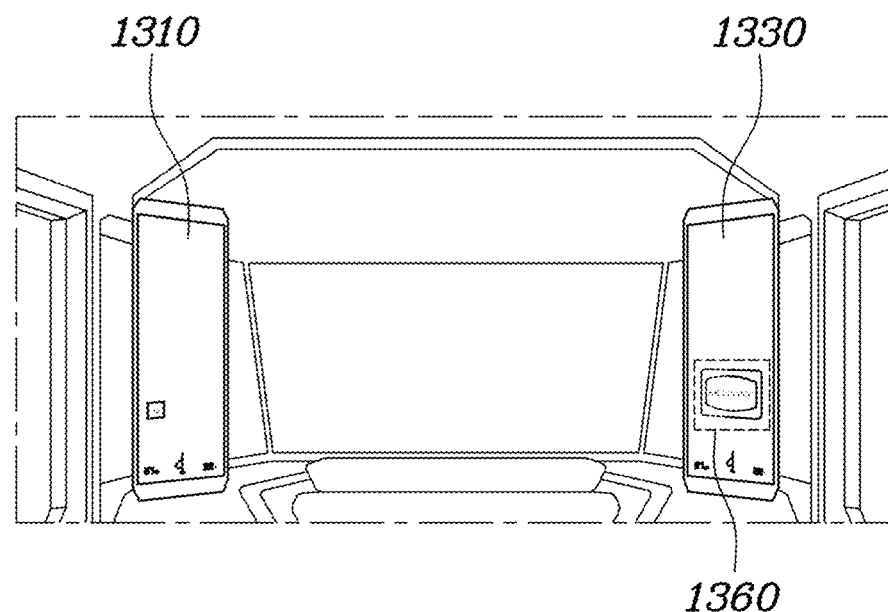
Figure 13D:
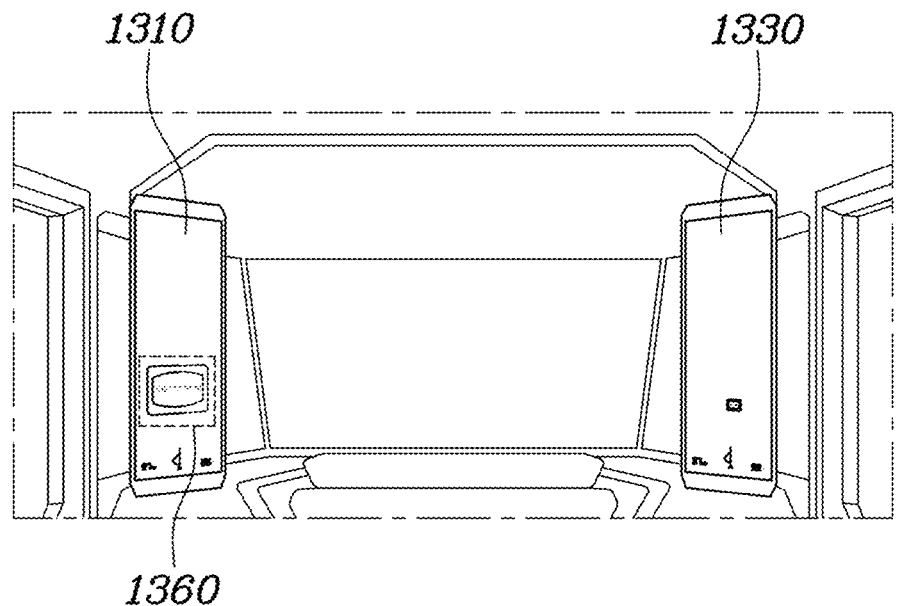
Figure 13E:
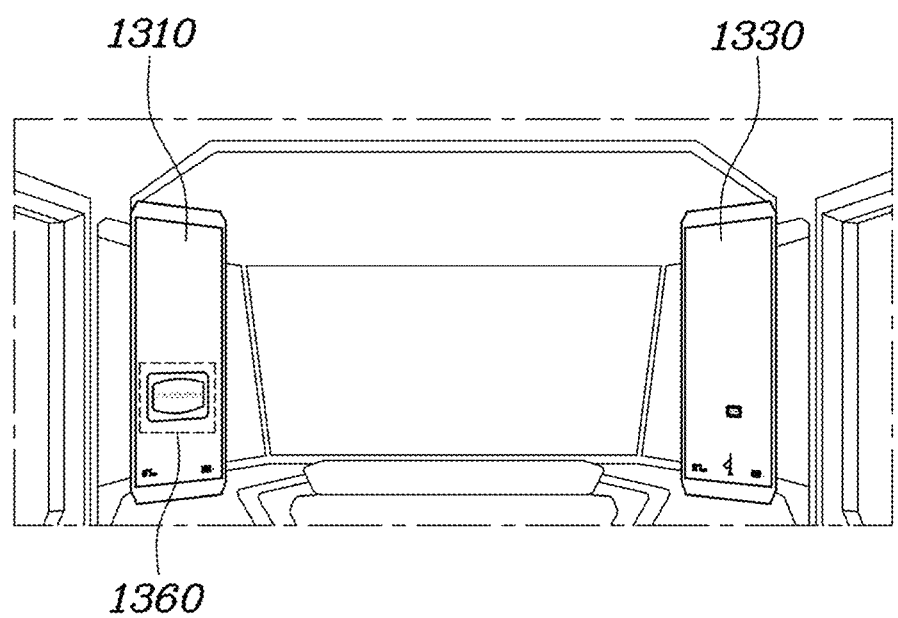
Figure 13F:
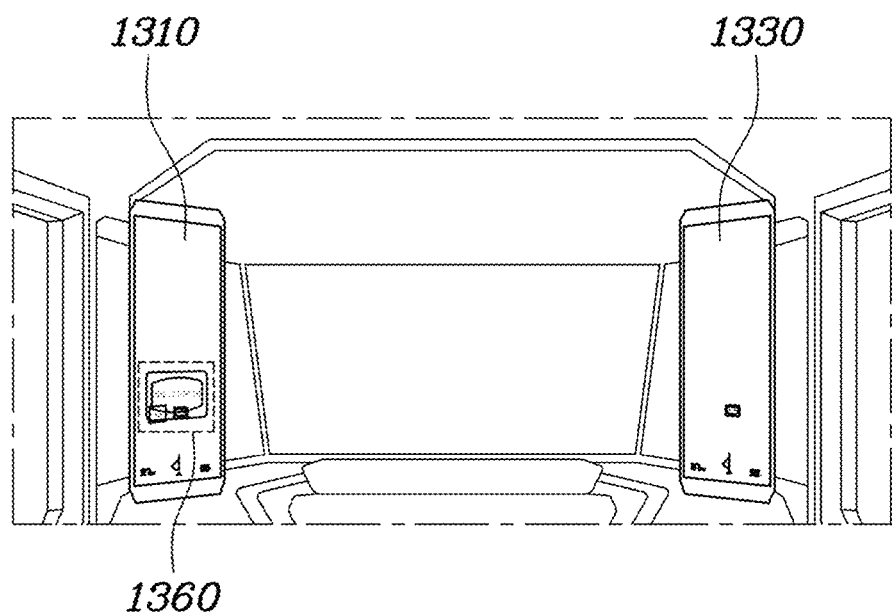

At this time, when the passenger passes the discount coupon 1360 to the left through a swipe gesture, the discount coupon 1360 may pass through the left side of the screen of the second display 1330 and reach the right side of the screen of the first display 1350 as shown in FIG. 3D, and then be displayed in the center of the screen of the first display 1350 as shown in FIG. 13E. At this time, the passenger in the left seat of the vehicle may store the discount coupon 1360 in a coupon box through a swipe gesture, and the discount coupon 1360 may be displayed on the first display 1310 as shown in FIG. 13F and finally stored in the user's coupon box. The coupon stored in the coupon box may be stored on the user's linked cell phone or the like, and the user may present the coupon stored in the coupon box when visiting a store to receive the discount benefit.

FIG. 14 illustrates an example in which a plurality of displays is implemented in a pillar display device according to an embodiment of the present invention.

FIG. 14 shows that a program such as a software or an application for operating the four pillar displays forming a plurality of display portions may be developed such that the four screens may be operated by a single program as if the screens were a single display device with four connected screens. The display device developed to be operated by a single program may be divided into four quadrants respectively disposed in the quarter views. When a system where the four display screens may be controlled by a single program is developed, the use of multi-touch interaction within the single program may minimize delays between multiple users, that is, multiple displays.

According to various embodiments of the present invention as described thus far, blind spots may be eliminated, which is an advantage of conventional A-pillar see-through projection technology, and various contents related to driving environments may be offered by providing an additional graphic user interface (GUI) to the external image displayed on the corresponding display Further, obstruction of the front view may be minimized and outside environments such as pavements and sidewalks may be efficiently shown by disposing the display in the quarter view.

Further, various contents such as advertising information, augmented reality (AR) information, mixed reality (MR) information, and the like combined with outside environments may be offered.

Further, the four displays disposed in different directions rather than being worn on the body like a conventional head-mounted display may provide immersive realistic images of environment.

Further, independent environments may be provided to different passengers through a plurality of displays, and two or four contents connected to each other may be offered on the plurality of displays as needed.

Further, content for which communication between passengers, such as message transmission, item delivery, and the like, is possible may be offered.

On the other hand, the present invention described above may be implemented as a computer-readable code on a medium on which a program is recorded. The computer-readable medium includes any type of recording device in which data that can be read by a computer system is stored. Examples of computer-readable mediums are hard disk drive (HDD), solid state disk (SSS), ROM, RAM, CD-ROM, magnetic tape, floppy disk, optical data storage device, and the like. Accordingly, the detailed description provided above should not be interpreted restrictively but should be considered illustrative. The scope of the present invention should be determined by a reasonable interpretation of the appended claims, all modifications with the equivalent scope of the present invention are included in the scope of the present invention.

What is claimed is:

1. A method of controlling a pillar display device of a vehicle, the method comprising:
   capturing, by at least one external camera, at least one external image;
   capturing, by at least one internal camera, a gaze of at least one passenger who will be provided with the external image on display screens and automatically detecting an occupation status of each seat in the vehicle;
   determining, by a gaze information processor, an area to be displayed on the display screens from among external images captured based on the passenger's gaze;
   correcting, by an image optimizer, an image of the determined area;
   transmitting, by an image information transmitter, the corrected image to the display screens;
   displaying, by a display portion, the transmitted image on the display screens, wherein a respective display screen is disposed at a different angle; and
   automatically adjusting an angle of at least one of the display screens to orient a respective display screen toward a respective passenger respectively matching the respective display screen based on a number of passengers in the vehicle and the occupation status of each seat in the vehicle.

2. The method of claim 1, wherein, in the determining an area to be displayed on the display screens, the area, the image of which looks seamlessly connected to a view visible through a windshield and side windows of the vehicle to create a see-through effect as if the display screens were a window, is determined to be the area to be displayed on the display screens.

3. The method of claim 1, further comprising storing, by an image information processor, the external image in real time.

4. The method of claim 1, wherein the external camera is a 3D camera configured to capture a 3D image with depth, and the external image is a 3D image with depth.

5. The method of claim 1, wherein, in the correcting the image of the determined area, an image of the determined area is corrected into an image optimized to ensure that a perspective, a shape, and a depth are not distorted when presented to the passenger.

6. The method of claim 1, wherein the adjusted angles are maintained.

7. The method of claim 1, wherein the angles of the display screens are adjusted in real time to orient the respective data screen toward the respective matching passenger.

8. A pillar display device comprising:
at least one external camera capturing at least one external image;
at least one internal camera capturing a gaze of at least one passenger who will be provided with the external image on display screens and automatically detecting an occupation status of each seat in the vehicle;
a gaze information processor determining an area to be displayed on the display screens from among external images captured based on the passenger's gaze;
a processor correcting an image of the determined area;
an image information transmitter transmitting the corrected image to the display screens; and
a display portion configured to display the transmitted image on the display screens, wherein a respective display screen is disposed at a different angle, an angle of at least one of the display screens are automatically adjusted to orient a respective display screen toward a respective passenger respectively matching the respective display screen based on a number of passengers in the vehicle and the occupation status of each seat in the vehicle.

9. The pillar display device of claim 8, wherein the gaze information processor determines an area, the image of which looks seamlessly connected to a view visible through a windshield and side windows of the vehicle to create a see-through effect as if the display screens were a window, to be the area to be displayed on the display screens.

10. The pillar display device of claim 8, further comprising an image information processor storing the external image in real time.

11. The pillar display device of claim 8, wherein the external camera is a 3D camera configured to capture a 3D image with depth, and the external image is a 3D image with depth.

12. The pillar display device of claim 8, wherein the image optimizer corrects the image of the determined area into an image optimized to ensure that a perspective, a shape, and a depth are not distorted when presented to the passenger.

13. The pillar display device of claim 8, wherein the adjusted angles are maintained.

14. The pillar display device of claim 8, wherein angles of the display screens are adjusted in real time to orient the respective data screen toward the respective matching passenger.

* * * * *